United States Patent [19]
Kreutzer et al.

[11] Patent Number: 5,788,909
[45] Date of Patent: Aug. 4, 1998

[54] ELEVATED-TEMPERATURE PNEUMATIC APPARATUS AND METHOD

[75] Inventors: Robert William Kreutzer, Poway; Bryan Imber, San Diego, both of Calif.

[73] Assignee: McDonnell Douglas Corporation, Huntington Beach, Calif.

[21] Appl. No.: 863,611

[22] Filed: May 27, 1997

Related U.S. Application Data

[63] Continuation of Ser. No. 524,427, Sep. 6, 1995, abandoned.

[51] Int. Cl.[6] ............... B29C 43/04; B30B 1/36
[52] U.S. Cl. ............ 264/320; 100/269.02; 100/269.03; 264/DIG. 6; 425/394
[58] Field of Search ............... 264/314, 321, 264/320, DIG. 6; 425/389, 394; 100/269.02, 269.03, 269.04, 236

[56] References Cited

U.S. PATENT DOCUMENTS

| | | | |
|---|---|---|---|
| 2,094,798 | 10/1937 | Kehrbeck | 100/269.03 |
| 2,257,222 | 9/1941 | Bergmann | 264/314 |
| 3,376,808 | 4/1968 | Beckett et al. | 100/269.03 |
| 3,576,930 | 4/1971 | Watters et al. | 264/314 |
| 3,614,811 | 10/1971 | Johnson | 264/314 |
| 4,101,254 | 7/1978 | Wiltshire | 264/112 |
| 4,148,597 | 4/1979 | Larsen | 264/314 |
| 4,154,272 | 5/1979 | Huffman, Jr. | 425/389 |
| 4,447,201 | 5/1984 | Knudsen | 264/314 |
| 4,560,523 | 12/1985 | Plumley et al. | 425/389 |
| 4,645,624 | 2/1987 | Ramm et al. | 264/332 |
| 5,372,491 | 12/1994 | Fritsch et al. | 264/314 |
| 5,462,427 | 10/1995 | Kramer | 425/231 |

FOREIGN PATENT DOCUMENTS

| | | | |
|---|---|---|---|
| 53-34870 | 3/1978 | Japan | 264/314 |
| 859185 | 8/1981 | U.S.S.R. | 425/389 |

*Primary Examiner*—Allan R. Kuhns
*Attorney, Agent, or Firm*—Bell Seltzer Intellectual Property Law Group of Alston & Bird, LLP

[57] ABSTRACT

An apparatus for consolidating a workpiece includes an oven having a heating cavity and a consolidation press received within the heating cavity of the oven. The consolidation press includes a base, a pressure platen disposed in facing relation to the base, and an expandable bellows operatively connected to the pressure platen to force the pressure platen toward the base. The bellows is expanded by a gas pressure supplied by a pneumatic source. In operation, a workpiece is placed between the base and the platen, and a force is applied to the workpiece by operation of the bellows.

14 Claims, 2 Drawing Sheets

ELEVATED-TEMPERATURE PNEUMATIC APPARATUS AND METHOD

This application is a continuation of application Ser. No. 08/524,427, filed Sep. 6, 1995, now abandoned.

BACKGROUND OF THE INVENTION

This invention relates to the consolidation of workpieces at elevated temperature.

A number of manufacturing operations for advanced structures, such as those made of nonmetallic composite materials, require the consolidation of workpieces at elevated temperature. As an example, the fabrication of structures from nonmetallic, fiber-reinforced composite materials typically involves layup of prepreg pieces of the composite material, and pressing of the prepreg pieces at elevated temperature to consolidate and cure the pieces. In another example, syntactic foams are prepared by placing a foam-forming mixture of curable polymer precursor and hollow second phase particles into a form, and simultaneously heating and applying a force to the mixture to achieve a consolidated, cured foam article having a shape defined by the die to which the force is applied.

In these cases, a moderate pressure of a few pounds per square inch to several hundred pounds per square inch is applied during the consolidation and curing operation at elevated temperature. The pressure need not be large, but its presence is essential to the success of the fabrication process.

Two techniques have generally been used to apply the consolidation pressure. In one, the workpiece is placed inside an elastomeric bag, which in turn is placed inside an autoclave (an oven with a pressurizable heating cavity). The oven is simultaneously heated and pressurized. This approach is successful and widely employed, particularly where the final article is complexly shaped and where the workpiece itself defines the extent to which consolidation can occur. The bagging technique has limitations on the temperature to which the workpiece can be heated, since at the present time there are no elastomeric bag materials suitable for use above about 500° F., and on the form to which the workpiece can be consolidated in the event that the workpiece is highly compliant. The bagging technique is also typically time consuming and costly, because the bagging operation itself involves a layup procedure and because the autoclave is expensive.

Alternatively, hydraulic presses with movable rams extending into an oven cavity have been used to apply a consolidation force. This approach is also operable, but has the drawback that scale-up to large parts is expensive. Care must be taken that the hydraulic portion of the device is not overly heated, as the seals rapidly degrade at elevated temperatures.

There is therefore a need for an improved approach for simultaneously heating and consolidating a workpiece. The present invention fulfills this need, and further provides related advantages.

SUMMARY OF THE INVENTION

The present invention provides an apparatus to consolidate workpieces at elevated temperatures and a method for the consolidation and heating. The approach of the invention achieves consolidation at intermediate temperatures above those possible with bagging techniques. The moderate pressures required for composite-material consolidation are readily and controllably reached. The consolidation forces are generated by gas pressure rather than liquid pressure, so equipment leaks, if any, do not result in contamination. The technique is relatively inexpensive, as it uses inexpensive components. It is therefore well suited for both prototyping preparation of a relatively small number of workpieces and production operations. The approach of the invention is readily scaled to small or large workpieces. It does not require the use of expensive, disposable bagging materials and does not require the use of an autoclave. In many cases, existing ovens can be used as the heating source, without modification.

In accordance with the invention, an apparatus for hot consolidating a workpiece comprises an oven having a heating cavity therein, and a consolidation press received within the heating cavity of the oven. The consolidation press includes a base, a pressure platen disposed in facing relation to the base, and an expandable bellows having a first end operatively connected to the pressure platen to force the pressure platen toward the base. The bellows is preferably made of a metallic material such as stainless steel. A pneumatic source is located outside the heating cavity of the oven, and a pneumatic transmission line communicates between the pneumatic source and the interior of the bellows. The pneumatic source is a source of a pressurized gas such as nitrogen. There is also desirably a frame connecting the base to a second end of the expandable bellows to react the forces applied to the workpiece through the base and the platen. Larger workpieces are accommodated either by enlarging the bellows or by providing multiple bellows arrangements.

In a method according to the invention, a method for processing workpieces at elevated temperature comprises the steps of providing an apparatus of the type just discussed, placing a workpiece between the base and the platen, heating the workpiece to an elevated temperature, and applying a force to the workpiece by expanding the bellows of the consolidation press.

The approach of the invention is most effectively used in the simultaneous heating and consolidating workpieces made of nonmetallic composite materials such as polymer/reinforcement composite materials and thermoplastic syntactic foams. Such workpieces require only moderate consolidation pressures. The apparatus and method are useful in prototyping operations wherein one or a few parts of a particular type are prepared, because the apparatus is relatively inexpensive and there is minimal process development for each new type of workpiece.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
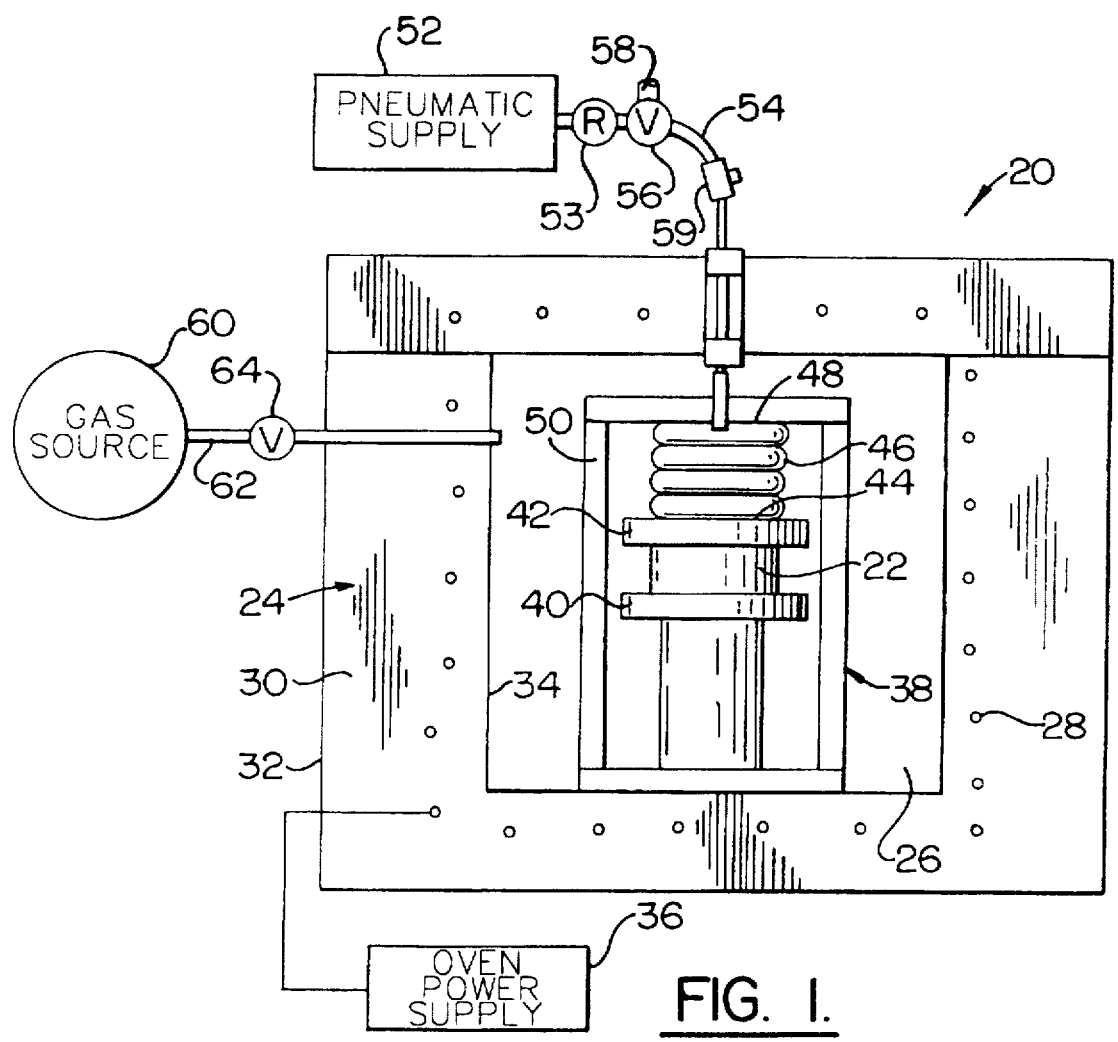
FIG. 1 is a schematic drawing of an apparatus according to the invention.

FIG. 1 depicts an apparatus 20 for hot consolidating a workpiece 22. The apparatus 20 includes an oven 24 having a heating cavity 26 therein which is heated during the operation of the oven. The preferred oven 24 is an electrical resistance oven, having electrical resistance elements 28 and appropriate insulation 30 contained between the outer wall 32 and the inner wall 34 of the oven 24. The resistance elements 28 are powered by an oven power supply 36. This type of oven is widely available commercially in a range of sizes and heating capabilities, for use in other applications. A particular virtue of the present approach is that commercially available ovens can be used with little or no modification.

A consolidation press 38 is located within the heating cavity 26. The consolidation press 38 includes a base 40 and a platen 42, which together function as an open die set, disposed in facing relation to each other. The base 40 and the platen 42 may be generally flat, as illustrated, or of curved or other shapes specific to workpieces being consolidated.

A first end 44 of a bellows 46 contacts the opposing side of the platen 42 (that faces away from the base 40). The bellows 46 preferably is formed of a metal such as stainless steel or a nickel-base alloy that is resistant to oxidation at elevated temperatures. Such bellows are known for other purposes. Suitable bellows can be obtained commercially from HySpan Precision Products, Chula Vista, Calif., and other sources.

A second end 48 of the bellows 46 contacts or is affixed to a frame 50. The frame 50 extends to the base 40 outside of the footprint of the base 40, the platen 42, and the bellows 46. Compressive forces generated between the platen 42 and the base 40, and thence transmitted through the workpiece 22, by the expansion of the bellows 46 are reacted through the frame 50. The sides of the frame 50 may also act as a guide for the movement of the platen 42 as the bellows 46 is expanded and contracted, or separate guide rods can be attached to the sides of the frame.

A pressurized gas, preferably nitrogen, is controllably introduced to the interior of the bellows 46 from a pneumatic supply 52. The gas flows from the pneumatic supply 52 through a pressure regulator 53, a three-way valve 56, a pneumatic transmission line 54, and into the interior of the bellows 46. The pressure regulator 53 controls the pressure of the gas that is ultimately applied to the interior of the bellows 46. The three-way valve 56 is set in a first position to direct the gas into the bellows 46 when pressure is to be applied to the workpiece 22, to a second position to release the pressure within the bellows 46 through a vent 58 when the pressure is to be released or reduced, or to a third closed position to block the application of pressure to the bellows. A preset pressure release vent 59 is also preferably provided between the valve 56 and the bellows 46. The release vent 59 is normally closed, but automatically opens as a safety measure in the event that the pressure in the line 54 increases above the preset value.

The pneumatic supply 52 is preferably a commercial gas cylinder easily available at nearly all industrial facilities, and the regulator 53 is preferably a manual pressure regulator generally provided with such a gas cylinder. The valves 56 and 59 are standard pneumatic valves. The line 54 is of small diameter tubing, typically about ¼–⅜ inch, so that it fits through a small opening in the wall of the oven 24, a small gap in the door of the oven, or the like. The oven can therefore be used for the present application, typically with little or no modification, and used for other applications as well at other times. The bellows 46 is preferably stainless steel or other oxidation-resistant alloy, so that it resides inside the oven 24. This pressurization arrangement is to be contrasted with the possible use of hydraulic systems (which is outside the scope of the present invention). In that case, a fluid-pressurization pump, fluid reservoir, and related apparatus are required. The hydraulic cylinder must be placed outside of the oven to prevent damage to its seals by elevated-temperature exposure, and the oven must be modified to permit a ram attached to the hydraulic cylinder to pass through a wall into the interior of the oven. Once modified for this application, in many cases the oven cannot be used for other applications. Thus, the capital cost and operating costs, such as repair costs, of the present pneumatic system are significantly less than for a hydraulic system. A leak occurring in a pneumatic system operating with a nonvolatile gas such as nitrogen poses little danger, while a leak occurring in a hydraulic system can result in contamination of the oven or the workpiece or fire risks if a flammable hydraulic fluid is used.

The heating cavity 26 can be left exposed to the atmosphere. Alternatively, if the particular workpiece 22 is degraded at elevated temperature by atmospheric exposure, the interior of the heating cavity can be supplied with a selected gaseous environment from a gas source 60 through a conduit 62 and a valve 64. Although illustrated as a different source in the drawing for generality, the gas source 60 could be the same as the pneumatic supply 52.

The base 40 and platen 42 of FIG. 1 are shown as flat, facing elements that can be moved arbitrarily close together by a sufficiently high force supplied by the bellows 46. In another approach within the scope of the invention and as depicted for a variation of the consolidation press in FIG. 2, the movement of the platen 42' under the force of the expanding bellows 46' is limited by stops 66 set into the frame 50'. (In FIG. 2, details of the oven, pneumatic supply, and other features common with FIG. 1 are omitted from the drawing for clarity, but would be used in practice.) The stops 66 define the final height of the consolidated workpiece 22'. In the illustrated case, the portion of the frame 50' adjacent to the workpiece 22' also acts as a closed mold to shape the sides of the consolidated workpiece. Equivalently, the closed mold can be structured as an element separate from the frame. Also as illustrated in FIG. 2, one or both of the platen 42' and the base 40' can be curved or of other selected shape as desired for the final shape of the particular workpiece being processed.

Figure 3:
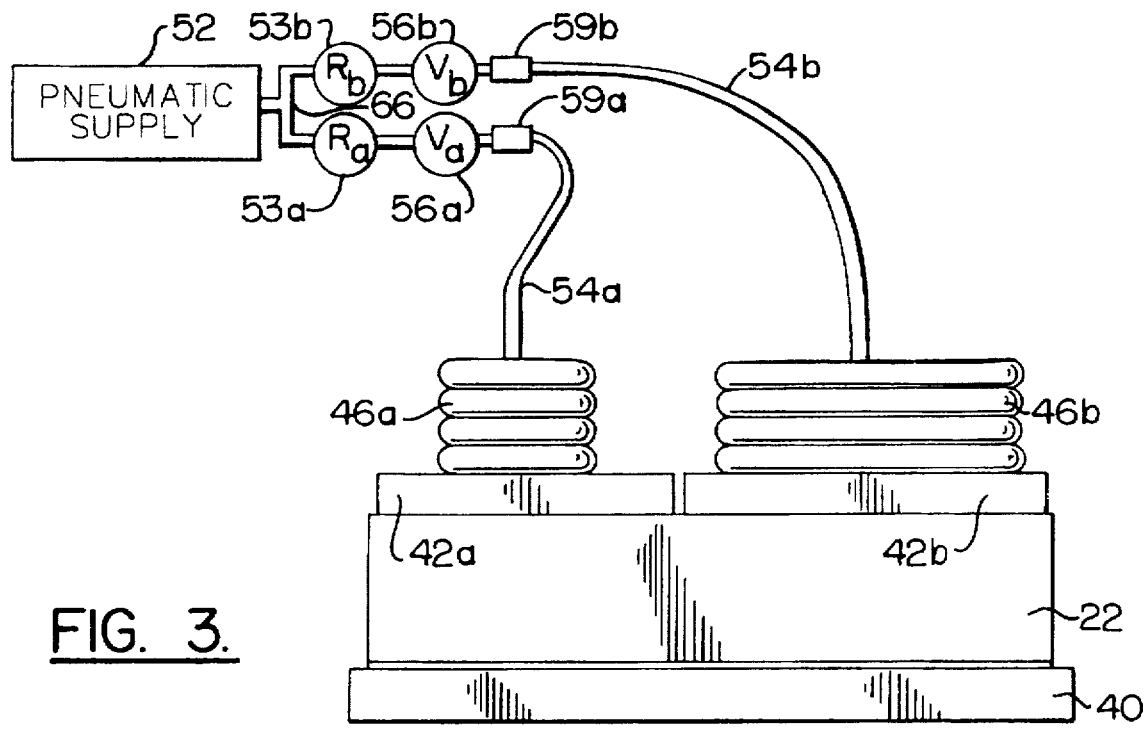
FIG. 3 is a schematic drawing of another embodiment of the invention using multiple bellows.

FIG. 3 illustrates a convenient approach to scale-up of the present invention to application to larger workpieces than possible with a single bellows 46. (In FIG. 3, details of the oven, frame, and other components common with the structure of FIG. 1 are omitted from the drawing for clarity, but would be used in practice.) Here, two bellows 46a and 46b arranged in parallel fashion, and two respective platens 42a and 42b, apply consolidation pressure to a single workpiece 22 and base 40. The multiple bellows may also be arranged in series fashion to obtain greater extension, if desired, or at an angle to each other in order to apply orthogonal components of pressure to the workpiece. The bellows 46a and 46b, and the platens 42a and 42b, are shown as being of different sizes for generality, but could be of the same size. The elements of the pneumatic supply system for the bellows 46a and 46b are comparable to that shown in FIG. 1. A single pneumatic supply 52 having an outlet "T" fitting 66 supplies the gas pressure to the bellows 46a, including the elements 53a, 56a, 59a, and 54a, and to the bellows 46b, including the elements 53b, 56b, 59b, and 54b. (This principle can be applied to more than two bellows as well.) The separate pressure regulators 53a and 53b permit different pressures to be applied to different areas of the workpiece 22. All of these duplicate pneumatic elements are relatively inexpensive. If, however, the same pressures were to be applied to the two bellows 46a and 46b, then the same pressure application components 53, 56, and 59 can be used, with a "T" fitting permitting pressure to be conducted to the bellows.

Figure 2:
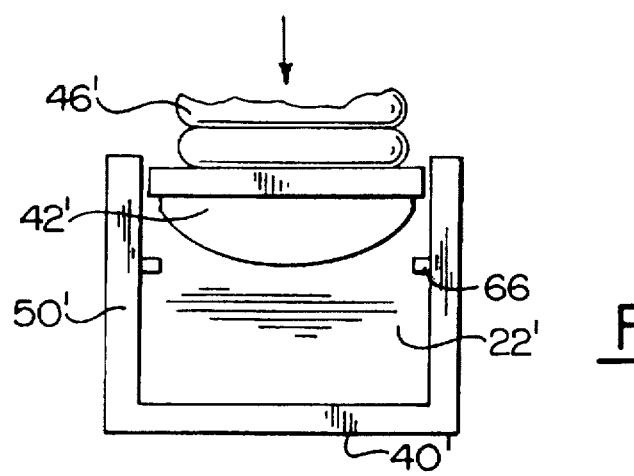
FIG. 2 is a schematic sectional view of a mold structure particularly useful in the curing and consolidating of syntactic foam materials.

The variations shown in FIGS. 2 and 3 to the basic approach of FIG. 1 can be used singly or in any operable combination. A particular virtue of the present invention is that the various arrangements of consolidation press elements and pneumatic supply elements are assembled relatively quickly and inexpensively from readily available parts, as compared with either a bagging or a hydraulic approach. Because little or no modification is required to a standard oven in order to practice these custom configurations, the present approach is particularly well suited for prototyping or small production runs, but can also be used for large production runs.

Figure 4:
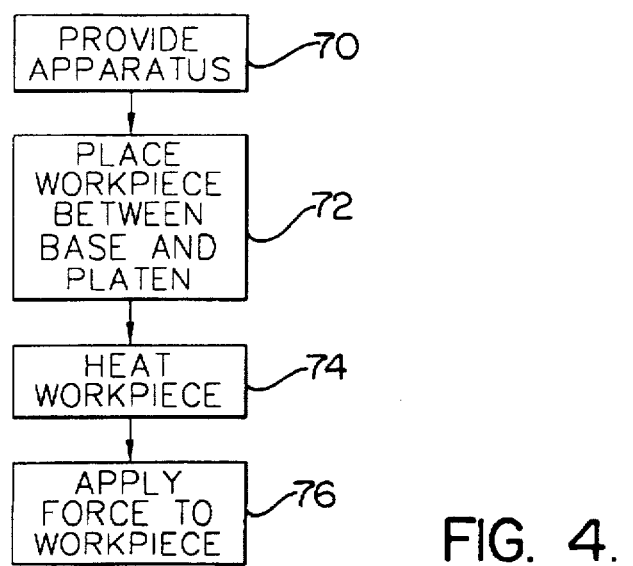
FIG. 4 is a block diagram of a method according to the invention.

FIG. 4 illustrates a preferred method for practicing an embodiment of the invention. An apparatus is provided, numeral 70, preferably the apparatus 20 described previously or other operable form. The workpiece 22 is provided and placed between the base 40 and the platen 42, numeral 72. The workpiece is typically a curable foam material mixed together with hollow microspheres or the like, a precursor structure to a syntactic foam. In another application of interest, the workpiece is a laid-up structure formed of reinforcement fibers or particles mixed into a B-stage, pre-polymer resin.

The workpiece 22 is heated, numeral 74, by operating the oven power supply 36 to heat the oven 24. A force (pressure) is applied to the workpiece 22, numeral 76, using the pneumatic supply system to pressurize the bellows. The heating 74 and force application steps 76 are preferably performed simultaneously. The heating and force application can include simple or complex heating/pressurization schedules as appropriate for a particular workpiece. The specific combination of heat, pressure, and time is typically specified by the manufacturer of the material of which the workpiece is made, and such specific schedules are outside the scope of the present invention.

The present invention has been reduced to practice using an apparatus like that shown in FIG. 1, except that a closed support mold generally of the type shown in FIG. 2 was used to contain the syntactic foam workpiece. The frame was constructed of 3 inch square tubular, 1/16 inch wall thickness, mild steel support members. The bellows was a 6 inch diameter stainless steel bellows, HySpan Precision Products part no. QD1349. The pneumatic supply was a nitrogen gas cylinder, and a standard pressure regulator and standard pneumatic valves and tubing were used. The workpiece was a flat billet having dimensions of 2 feet by 2 feet by 3 inches thick, after consolidation. The workpiece was a mixture of a thermoplastic resin and about 70–86 percent glass microspheres, which resulted in a syntactic foam after consolidation and curing was complete. A conventional non-pressurized oven was used, selected to be of sufficient size to contain the workpiece, the mold, the frame, and the bellows. The consolidation/heating schedule included heating to 600° F. and holding for 4 hours with no pressure applied, and thereafter application of a pressure of about 3 pounds per square inch while maintaining the 600° F. temperature to reach the final workpiece thickness. The operation was successful.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. Apparatus for hot consolidating a workpiece, comprising:

an oven having a heating cavity therein;

a consolidation press received within the heating cavity of the oven, the consolidation press being capable of withstanding temperatures of at least 500° F. and including a base, a pressure platen disposed in facing relation to the base, and an expandable bellows having a first end operatively connected to the pressure platen to force the pressure platen toward the base upon expansion of the bellows, said bellows being formed of metal;

a pneumatic source of a pressurized gas located outside the heating cavity of the oven; and a pneumatic transmission line communicating between the pneumatic source and the interior of the bellows.

2. The apparatus of claim 1, wherein the oven is a resistance-heated oven.

3. The apparatus of claim 1, wherein the expandable bellows is formed of stainless steel and the consolidation press is capable of withstanding temperatures of at least of 600° F.

4. The apparatus of claim 1, wherein at least one of the platen and the base is curved.

5. The apparatus of claim 1, wherein the platen and the base are both substantially flat.

6. The apparatus of claim 1, wherein the consolidation apparatus further includes at least one additional bellows.

7. The apparatus of claim 1, wherein the consolidation apparatus further includes a mold disposed to receive a workpiece therein.

8. The apparatus of claim 1, wherein the consolidation apparatus further includes a frame extending between the base and the a second end of the bellows.

9. The apparatus of claim 1, wherein the pneumatic source comprises a pneumatic supply of a pressurized gas, a pressure regulator which receives the gas from the pneumatic supply, and a control valve which receives the gas from the pressure regulator.

10. The apparatus of claim 1, wherein the apparatus further includes:

a workpiece positioned between the base and the platen.

11. The apparatus of claim 10, wherein the workpiece is a piece of syntactic foam.

12. The apparatus of claim 1, further including a second expandable bellows in parallel arrangement with the expandable bellows, the second expandable bellows having a first end operatively connected to a second pressure platen to force the second pressure platen toward the base upon expansion of the bellows, a second pneumatic transmission line communicating between the pneumatic source and the interior of the bellows.

13. A method for processing workpieces at elevated temperature, comprising the steps of:

providing an apparatus including an oven having a heating cavity therein, a consolidation press received within the heating cavity of the oven, the consolidation press including a base, a pressure platen disposed in facing relation to the base, and an expandable bellows formed of metal and operatively connected to the pressure platen to force the pressure platen toward the base, a pneumatic source of a pressurized gas located outside the heating cavity of the oven, and a pneumatic transmission line communicating between the pneumatic source and the interior of the bellows;

placing a workpiece between the base and the platen;

heating the workpiece to an elevated temperature of at least 500° F.; and applying a force to the workpiece by applying pneumatic pressure to the interior of the bellows, thereby expanding the bellows of the consolidation press.

14. The method of claim 13, wherein the step of placing a workpiece includes the step of placing a workpiece which is at least in part a syntactic foam.

* * * * *

UNITED STATES PATENT AND TRADEMARK OFFICE
CERTIFICATE OF CORRECTION

PATENT NO. : 5,788,909
DATED      : August 4, 1998
INVENTOR(S): Kreutzer et al.

It is certified that error appears in the above-identified patent and that said Letters Patent is hereby corrected as shown below:

On the title page

In the References Cited, U.S. PATENT DOCUMENTS, please add three patents cited in original application:

```
     877,139      Tatarinoff        1/1908
   1,368,253      Fulton            2/1921
   3,178,913      Olson             4/1965
```

Column 6, line 28, after "least", delete "of"; line 41, after "the", delete "a".

Signed and Sealed this

Fifteenth Day of December, 1998

*Attest:*

BRUCE LEHMAN

*Attesting Officer*  *Commissioner of Patents and Trademarks*